No. 806,697. PATENTED DEC. 5, 1905.
F. H. MORSE.
MILK STERILIZER OR PASTEURIZER.
APPLICATION FILED JUNE 24, 1905.
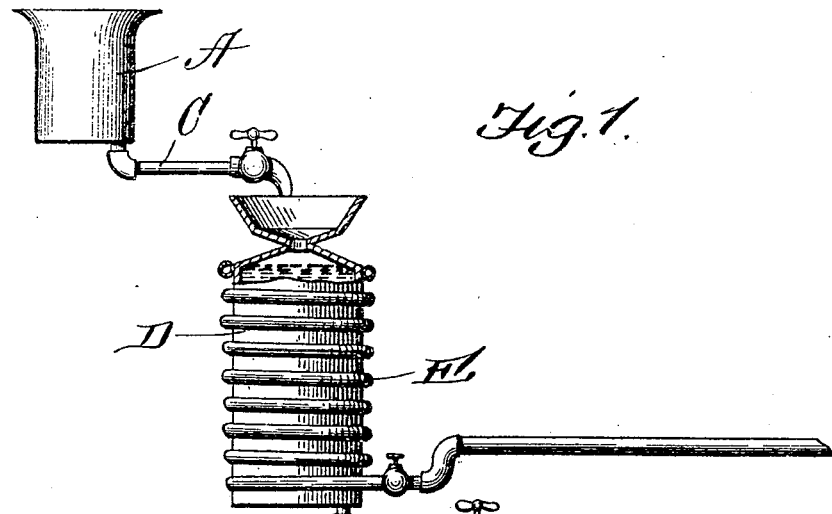
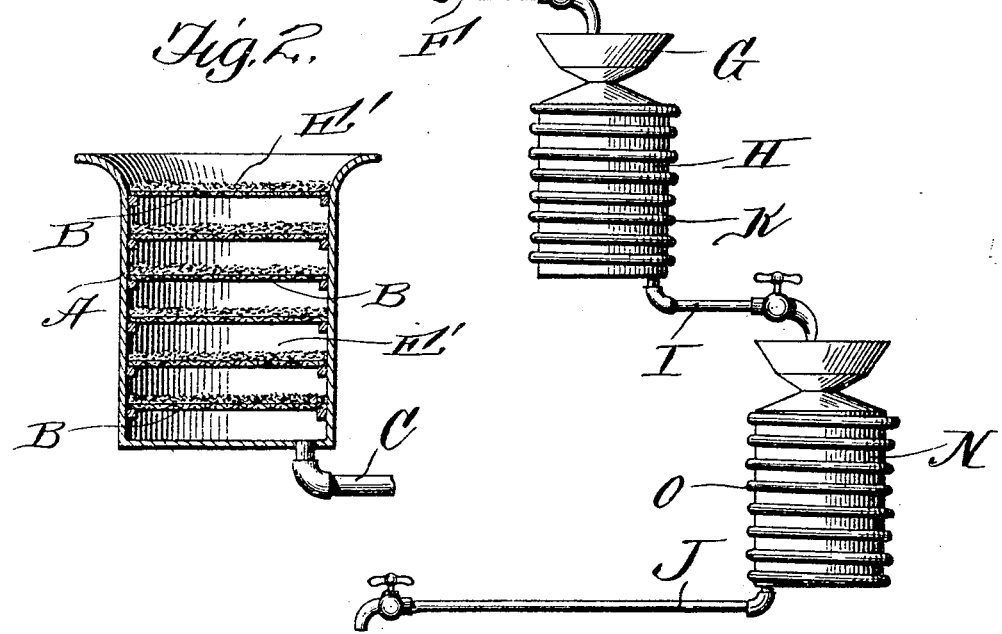

UNITED STATES PATENT OFFICE.

FRANK H. MORSE, OF SAVANNAH, GEORGIA.

MILK STERILIZER OR PASTEURIZER.

No. 806,697.  Specification of Letters Patent.  Patented Dec. 5, 1905.

Application filed June 24, 1905. Serial No. 266,792.

*To all whom it may concern:*

Be it known that I, FRANK H. MORSE, a citizen of the United States, residing at Savannah, in the county of Chatham and State of Georgia, have invented certain new and useful Improvements in Milk Sterilizers or Pasteurizers; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in an apparatus for sterilizing or pasteurizing milk and other liquids; and the object of the invention is to produce a simple and efficient apparatus whereby milk may be quickly and thoroughly treated by first passing the same through sand upon a wire-gauze and afterward heating the same by means of a heating agent passing through coils and afterward cooling the milk.

The invention consists in various details of construction and in combinations and arrangements of parts, which will be hereinafter fully described and then specifically defined in the appended claim.

My invention is illustrated in the accompanying drawings, which, with the letters of reference marked thereon, form a part of this application, and in which drawings—

Figure 1 is a vertical sectional view through my improved apparatus, and Fig. 2 is an enlarged sectional view through the tank containing the sand and wire-gauze.

Reference now being had to the details of the drawings by letter, A designates a receptacle having a series of transverse gauze partitions B, upon which sand E' is adapted to be placed, the mesh of the gauze being such as to prevent the particles of sand from passing through the gauze, and C designates a discharge-pipe leading from the receptacle B to a tank D. Surrounding the tank D is a coil E of pipe, through which hot water or steam is adapted to be passed, and F designates a discharge-pipe leading from the bottom of the tank D and emptying into a hopper G, formed at the upper end of a tank H. The tank H is surrounded with a coil of pipe K, through which a cooling liquid is adapted to be passed for the purpose of reducing the temperature of the milk after coming from the tank D, and a discharge-pipe I leads from the tank H and communicates with a tank N, which has a coil of pipe O passing about the same, through which a refrigerating agent is adapted to be passed for the purpose of still further reducing the temperature of the milk before it makes exit through a discharge-pipe J into any suitable receptacle for storage.

From the foregoing it will be observed that by the provision of the apparatus shown and described a simple and efficient means is provided for quickly treating milk by first causing the same to pass through sand and gauze partitions supporting the same and afterward to be heated and cooled in the manner described, thus thoroughly eliminating all forms of bacteria or foreign matter from the milk.

Having thus fully described my invention, what I claim as new, and desire to secure by Letters Patent, is—

A pasteurizing apparatus comprising a receptacle, gauze partitions within the same and a filtering medium of sand supported by said partitions, a tank communicating with said receptacle, a coil about the circumference of said tank through which hot water or steam is adapted to pass, a cooling-tank communicating with the tank about which hot water or steam circulates, a third tank adapted to receive the milk from the tank about which the cooling agent circulates, and refrigerating-coils about said third tank, as shown and described.

In testimony whereof I hereunto affix my signature in the presence of two witnesses.

FRANK H. MORSE.

Witnesses:
W. R. HEWLETT,
K. G. LAFFITTE.